United States Patent
Pepin et al.

(10) Patent No.: US 9,515,820 B2
(45) Date of Patent: Dec. 6, 2016

(54) PROTECTION AGAINST SIDE CHANNELS

(71) Applicant: Morpho, Issy les Moulineaux (FR)

(72) Inventors: Cyrille Pepin, Issy les Moulineaux (FR); François Lecocq, Issy les Moulineaux (FR); Victor Servant, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/426,101

(22) PCT Filed: Sep. 2, 2013

(86) PCT No.: PCT/FR2013/052013
§ 371 (c)(1),
(2) Date: Mar. 4, 2015

(87) PCT Pub. No.: WO2014/037657
PCT Pub. Date: Mar. 13, 2014

(65) Prior Publication Data
US 2015/0222423 A1    Aug. 6, 2015

(30) Foreign Application Priority Data

Sep. 4, 2012 (FR) .................................... 12 58237

(51) Int. Cl.
*H04L 9/06*    (2006.01)
*G06F 7/00*    (2006.01)
(Continued)

(52) U.S. Cl.
CPC ............... *H04L 9/0631* (2013.01); *G06F 7/00* (2013.01); *G06F 21/72* (2013.01); *H04L 9/002* (2013.01);
(Continued)

(58) Field of Classification Search
CPC .......... H04L 9/002; H04L 9/003; H04L 9/0631
See application file for complete search history.

(56) References Cited

U.S. PATENT DOCUMENTS

| 8,422,668 | B1* | 4/2013 | Thichina | H04L 9/003 380/28 |
| 2003/0048903 | A1* | 3/2003 | Ito | H04L 9/003 380/263 |

(Continued)

OTHER PUBLICATIONS

Bertoni, G., et al., "Efficient Software Implementation of AES on 32-Bit Platforms," in B.S. Kaliski Jr., et al. (eds.), "Cryptographic Hardware and Embedded Systems—CHES 2002: 4th International Workshop, Redwood Shores, CA, USA, Aug. 13-15, 2002, Revised Papers, vol. 4," Springer-Verlag, Berlin, 2002, Lecture Notes in Computer Science 2523, pp. 159-171.

(Continued)

*Primary Examiner* — David Pearson
(74) *Attorney, Agent, or Firm* — Christensen O'Connor Johnson Kindness PLLC

(57) ABSTRACT

The description pertains in particular to a method of protecting an electronic device (SCARD), when the electronic device implements a cryptographic algorithm (AES), against side channel attacks. The cryptographic algorithm (AES) operating on an array of states which forms the subject of a secure processing. The description relates also to an electronic device (SCARD), a computer program and a storage medium for the implementation of such a method.

12 Claims, 3 Drawing Sheets

$$\begin{pmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} * \begin{pmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{pmatrix}$$

MAT3    MIX_C    MAT2

(51) Int. Cl.
G06F 21/72 (2013.01)
H04L 9/00 (2006.01)

(52) U.S. Cl.
CPC ....... *H04L 9/003* (2013.01); *G06F 2207/7252* (2013.01); *H04L 2209/04* (2013.01)

(56) References Cited

U.S. PATENT DOCUMENTS

| | | | | |
|---|---|---|---|---|
| 2008/0285745 | A1* | 11/2008 | Teglia | H04L 9/003 380/29 |
| 2009/0003598 | A1* | 1/2009 | Itoh | H04L 9/003 380/46 |
| 2009/0158051 | A1* | 6/2009 | Michiels | H04L 9/002 713/189 |
| 2013/0230170 | A1* | 9/2013 | Chabanne | H04L 9/003 380/252 |

OTHER PUBLICATIONS

"Byte-oriented-aes—A Public Domain-Oriented Implementation of AES in C," <http://code.google.com/p/byte-oriented-aes> [retrieved Apr. 16, 2012], 1 page.
Daemen, J., and V. Rijmen, "AES Proposal: Rijndael," Document version 2, Sep. 3, 1999, <http:csrc.nist.gov/archive/aes/rijndael/Rijndael-ammended.pdf>, 45 pages.
Farhan, S.M., "High Data Rate 8-Bit Crypto Processor," Peer-Reviewed Proceedings of the ISSA Enabling Tomorrow Conference, Jun. 30-Jul. 2, 2004, Midrand, South Africa, 11 pages.
Federal Information Processing Standards Publication 197, "Announcing the Advanced Encryption Standard (AES)," Nov. 26, 2001, 51 pages.
Gladman, B., "A Specification for Rijndeal, the AES Algorithm," Version 3.3, May 1, 2002, pp. 1-29.
Gong, Z., et al., "Klein: A New Family of Lightweight Block Ciphers," in A. Juels and C. Paar (eds.), "RFID Security and Privacy: 7th International Worshop, RFID sec 2011, Amherst, MA, USA, Jun. 26-28, 2011, Revised Selected Papers," Springer-Verlag, Berlin, 2012, Lecture Notes in Computer Science 7055, pp. 1-18.
Guo, J., et al., "The LED Block Cipher," in B. Preneel and T. Takagi (eds.), "Cryptographic Hardware and Embedded Systems—CHES 2011: 13th International Workshop, Nara, Japan, Sep. 28-Oct. 1, 2011, Proceedings," Springer-Verlag, Berlin, 2011, Lecture Notes in Computer Science 6917, pp. 326-341.
Herbst, C., et al., "An AES Smart Card Implementation Resistant to Power Analysis Attacks," in J. Zhou et al. (eds.), "Applied Cryptography and Network Security, 4th International Conference (ACNS 2006), Singapore, Jun. 6-9, 2006, Proceedings," Springer-Verlag, Berlin, Lecture Notes in Computer Science 3989, pp. 239-252.
International Search Report mailed Nov. 29, 2013, issued in corresponding International Application No. PCT/FR2013/052013, filed Sep. 2, 2013, 2 pages.
Joye, M., et al., "On Second-Order Differential Power Analysis," in J.R. Rao and B. Sunar, "Cryptographic Hardware and Embedded Systems—CHES 2005: 7th International Workshop, Edinburgh, UK, Aug. 29-Sep. 1, 2005, Proceedings," Springer-Verlag, Heidelberg, Lecture Notes in Computer Science 3659, pp. 293-308.
Lu, J., et al., "Principles on the Security of AES Against First and Second-Order Differential Power Analysis," in J. Zhou and M. Yung (eds.), "Applied Cryptography and Network Security: 8th International Conference, ACNS 2010, Beijing, China, Jun. 22-25, 2010, Proceedings," Lecture Notes in Computer Science 6123, pp. 168-185.
Yu, B., et al., "An AES Chip With DPA Resistance Using Hardware-Based Random Order Execution," Journal of Semiconductors 33(6):065009-065016, Jun. 2012.

* cited by examiner $$\begin{pmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} * \begin{pmatrix} Y_{00} & Y_{01} & Y_{02} & Y_{03} \\ Y_{10} & Y_{11} & Y_{12} & Y_{13} \\ Y_{20} & Y_{21} & Y_{22} & Y_{23} \\ Y_{30} & Y_{31} & Y_{32} & Y_{33} \end{pmatrix}$$

↑ MAT3  ↑ MIX_C  ↑ MAT2

PROTECTION AGAINST SIDE CHANNELS

The invention relates to the protection of electronic devices implementing cryptographic algorithms (such as AES) against side channel attacks.

Side channel attacks exploit the physical properties of the electronic device being attacked, as it executes a cryptographic algorithm (the algorithm may be executed by software, hardware, or a combination of software and hardware). The fact that the cryptographic algorithm is secure from a purely mathematical (theoretical) standpoint does not necessarily guarantee that the practical implementation of the cryptographic algorithm by a given electronic device is secure.

It is therefore known to attack an electronic device non-invasively by externally observing some of its operating parameters.

An attacker can, for example, engage in an acoustic cryptanalysis consisting of analyzing noise generated by the electronic device as it executes the cryptographic algorithm. This is because the electronic device may emit noise (or vibrations, possibly inaudible) that varies in intensity and in nature according to the operations performed. Capacitors that are charging or discharging may issue crackling noises that can be measured.

It is also known to analyze the electromagnetic emanations of the electronic device, or to analyze its thermal image. The electromagnetic radiation from an electronic device, for example a processor, is dependent on what the device is currently doing, for example the processor is currently executing an instruction or the processor is manipulating data.

Attackers can also analyze the power consumption of the electronic device during execution of the cryptographic algorithm. Different parts of the cryptographic algorithm may have characteristic consumption patterns. It is therefore possible to analyze the power consumption of an electronic device at a given moment, and distinguish the tasks being performed according to the power that they consume.

These attacks can be combined to obtain secret information such as an encryption key used by the cryptographic algorithm. Implementation of these attacks is usually closely tied to the electronic device being attacked.

Through the use of a side channel (unanticipated or insufficiently protected by the person who engineered the electronic device) such as an acoustic wave channel, an electromagnetic channel, or a thermal channel (the channel examples given are in no way limiting), these attacks can impact the security of the implementation of the cryptographic algorithm.

A cryptographic algorithm is an algorithm intended to protect information with mathematics, ensuring for example its confidentiality, authenticity, or integrity. A cryptographic algorithm is often based on one or more keys, which may be secret, private, or public. Some cryptographic algorithms do not use keys, such as certain hash functions (such as the functions SHA-1, MD5, SHA-256, RIPEMD-160, etc.). Cryptographic algorithms include encryption algorithms (which render information unintelligible) and decryption algorithms (which recover the original information from the encrypted information), algorithms for electronic signature, signature verification, authentication, authentication verification, etc. Among the key-based cryptographic algorithms, some are said to be symmetric (for example DES, 3DES, AES, RC4, HMAC, etc.). Some symmetric algorithms are specialized (such as the HMAC algorithm used for signatures/signature verification but not for encryption/decryption). Symmetric algorithms are so named because they use the same key (generally referred to as a secret key) to encrypt and to decrypt, or to sign and verify a signature, etc. Thus, symmetric cryptographic algorithms require both parties using them to share keys in order to secure their communications. The AES ("Advanced Encryption Standard") algorithm is notable because it was the algorithm chosen in 2000 by the National Institute of Standards and Technology ("NIST") as the standard symmetric encryption algorithm for the government of the United States of America. Other cryptographic algorithms are called asymmetric (for example DSA, RSA, elliptic curve, etc.) because a different key is used by the parties to a communication. Each party has a private key (it is called a private key rather than a secret key in such cases, but the expression "secret key" is sometimes used as a misnomer) and an associated public key. For example, a party may use one of its private keys to sign information and it is a corresponding public key that is used by the other party to verify the signature, or a party may use a public key belonging to another party to encrypt information, and the other party can then use its corresponding private key to decrypt the information.

Cryptographic algorithms are often described very specifically in open specifications that are accessible to all, as the security of a cryptographic algorithm is generally not related to the secret of how it functions (algorithms presumed to be safe because they are secret often end up being cracked by reverse engineering). Specifications allow determining what an algorithm must output when given certain information as input. This ensures interoperability of the cryptographic algorithm, or in other words this ensures that different implementations are able to work with each other. For example, one can legitimately expect that information encrypted by any implementation of an encryption algorithm can be decrypted by any implementation of the corresponding decryption algorithm. However, this does not mean that there is only one possible implementation of each cryptographic algorithm. Quite the reverse: there are many possible implementations for each cryptographic algorithm, just as there are many possible ways to perform a calculation. For example, to calculate $X^2+2X+1$, we can calculate $X*X$, then $2*X$, then add the two terms and then add 1, or calculate $X+1$, multiply the result by $X$, then add 1, or calculate $X+1$ and square the result.

One would think that the security of a cryptographic algorithm depends only on its mathematical definition (and any keys that are used when these keys are secret or private) as described in a specification, and not on the exact manner in which it calculates the result defined in the specification. In reality this is generally not the case, as was shown above using the example of side channel attacks. It turns out that the security of a particular implementation of a cryptographic algorithm depends not only on the cryptographic algorithm itself, but also on how it is implemented, and on other factors such as the characteristics of the electronic device that will execute it.

It is well known that when an unprotected electronic device executes software implementing a cryptographic algorithm "naively", meaning in a way that merely produces from a given input the expected numeric result (such as an encryption result) according to specifications, it is often possible to obtain critical information about the execution of the cryptographic algorithm through passive listening to the electronic device. Passive listening has the advantage of being non-invasive. The electronic device is not damaged, and its owner may not necessarily be aware of the attack. The device is thus stolen and returned without its owner suspecting, or simply used in the absence of the owner or spied upon in the presence of the owner, without the owner being aware of this (for example by means of a module hidden between the electronic device and its power supply). The owner of an electronic device from which an AES key has been extracted by an attacker therefore does not revoke his AES key, as he has no reason to believe he was attacked.

The attacker can then freely use the AES key until the owner eventually realizes that operations he has not performed (electronic funds transfers for example) are being attributed to him, or that a third party has clearly had access to confidential information (for example a competitor keeps very slightly underbidding for the same Requests For Proposals).

Basic passive listening may simply involve identifying a particular characteristic based on a given measurement for the target electronic device. This is the case, for example, for SPA ("Simple Power Analysis") attacks. For example, in a modular exponentiation performed in a "naive" implementation of the RSA algorithm, the power consumption is very different when a bit of the exponent is equal to 1 (high consumption) than when this bit is 0 (low consumption). Indeed, in common implementations, a bit at 1 involves both a squaring operation and a multiplication operation (called "square and multiply"), while a 0 bit does not involve a squaring operation. It is then possible to observe the power consumption during modular exponentiation and thus identify the series of 1s and 0s of the exponent, corresponding to the power consumption fluctuations. The RSA exponent, if it is a private exponent, is a highly confidential data component of the RSA private key, which is generally not supposed to be known to anyone outside of the electronic device. Obtaining someone's private signature key makes it possible to sign as that person, and obtaining someone's private decryption key makes it possible to decrypt that person's messages.

However, such listening (which is easy to implement) is not always effective. More elaborate listening approaches are known, such as DPA ("Differential Power Analysis"), during which an attacker runs a cryptographic algorithm repeatedly, and each time records the signals produced (for example the power consumption measurements). The attacker then makes statistical calculations based on multiple recordings and obtains information in a more reliable manner that is more difficult to prevent.

To guard against such attacks, it is possible to make the electronic device more secure. For example, one can superimpose noise over the current to make such exploits more difficult, smooth the power consumption (with capacitors for example), limit electromagnetic emissions by appropriate shielding, etc. A particular internal clock may also be used that has a randomly varying frequency, which makes measurements difficult to exploit (the operations of the cryptographic algorithm are then performed at a rate which constantly changes and which in principle is unknown to the attacker). There are also other techniques, consisting for example of controlling physical and/or logical access to the electronic device. For example, smart cards implementing private key cryptographic algorithms generally protect the operations concerned with a PIN number. A person who temporarily steals the smart card in the hope of extracting the private key and then returns the card to its owner without the owner noticing, could not execute the algorithm in question without providing the correct PIN (which an informed user learns by heart and does not share with anyone), and therefore would not necessarily be able to carry out the attack.

These countermeasure techniques are useful, but are generally insufficient in themselves because they do not protect against all attack scenarios. Another method of protection is to use a method for securing the cryptographic algorithm, consisting of implementing the algorithm in such a way that it generates minimal (electrical or other) fluctuations.

For example, it is possible to modify the implementation of an RSA algorithm using a private key so that it performs operations having the same signature (electric, electromagnetic, etc.) at bit 1 or bit 0 in the private exponent of the private key. For example, a square and multiply can always be performed, but the result of the multiplication operation is used only if the bit is 1. It is obviously necessary to be vigilant and have the implementation be as symmetric as possible. For example, if there is a test to verify whether the multiplication result should be used, this test must behave in the same manner regardless of the outcome (or at least as close as possible), otherwise the passive listening could target this test to determine whether the bit was a 0 bit or a 1 bit.

Another method for improving security (which may be complementary to the previous one) is to mask the sensitive data. Sensitive data can be, for example, cryptographic keys, and/or an input message to be encrypted for example by the cryptographic algorithm, and/or some intermediate data manipulated during execution of the cryptographic algorithm. In some cases the attacker may know or may even choose the input message to be processed by the cryptographic algorithm, and can make more accurate predictions about the current calculation. The fact that the input message and/or intermediate data are masked in a way that in principle is unpredictable by the attacker takes information away from the attacker and can therefore seriously complicate the attack. In addition, should the masking be different for each use of the cryptographic algorithm, statistical analysis is complicated further. For example, several protection methods that mask the AES algorithm have been proposed to shield against side channel attacks. One traditional solution is additive masking, where the manipulated data x are replaced by masked data x+m ("+" indicating an "exclusive or"). This will easily pass through the linear operations of the algorithm. Non-linear substitution tables S[ ] are replaced by masked tables generated on the fly after selecting a new mask (or all pre-stored in memory, if there is sufficient memory). Thus, a nonlinear masked operation corresponding to a masked substitution table S'[ ], applied to data x masked by a random mask m1 can be written in the form:

$$y'=S'[x+m_1]=y+m_2=S[x]+m_2$$

where $m_2$ is a corresponding mask. At the end of the algorithm, the result is unmasked to obtain the final result (original data, encrypted and unmasked).

Attacks sometimes still manage to overcome the difficulties introduced by state of the art masking. In particular, some attacks such as HO-DPA ("High Order Differential Power Analysis") can be particularly difficult to avoid in certain circumstances. This is explained in the article "On Second-Order Differential Power Analysis" by Marc Joye, Pascal Paillier, and Berry Schoenmakers, published in Cryptographic Hardware and Embedded Systems, CHES 2005, Lecture Notes in Computer Science 3659 (2005) 293-308, Springer-Verlag. When the attacker manages to correlate power consumption (or other such information) more than once through calculations, he can sometimes overcome the masking.

Implementations of AES sometimes use other security mechanisms against physical attacks (particularly side channel attacks). This is often the case for AES implementations on secure electronic devices such as smart cards.

There are several attacks likely to compromise existing AES protection schemes, which already often use AES implementations requiring more memory and a longer execution time than an unmodified AES. In addition, components (purely hardware solutions) dedicated to this AES algorithm are not always available and a software implementation then becomes necessary, which can further slow the execution of the algorithm (and degrade performance from the end user's point of view).

AES operates on an input called a state array, which contains 16 bytes (4×4). It may use keys of 128, 192, or 256 bits. For simplicity, the examples provided will be based on the case of 128 bits unless otherwise stated. The structure of the AES encryption operation is as illustrated in FIG. 1 (retaining the original function names). The AES decryption function, structurally similar, is well known to a person skilled in the art.

As mentioned previously, a conventional method of protection against power consumption analysis attacks consists of recalculating the "SubBytes" portion of the algorithm while adding masking values. This method requires the use of a 256-byte table in RAM.

Another method (the randomization method) can be superimposed onto this to further protect the AES implementation. The internal operations are then performed in an at least partially random order.

Most known analytical attacks concern only the first two or last two rounds of the AES. Masking and randomization are then only useful for these rounds, and the rest can be left as is (unmodified execution). However, a recent article ("Principles on the Security of AES Against First and Second-Order Differential Power Analysis" Jiqiang Lu, Jing Pan, and Jerry den Hartog in ACNS 2010, LNCS 6123) suggests that it would be possible to attack several additional rounds and that therefore it might be appropriate to apply protections to these other rounds as well.

However, there is no effective way to apply randomization to more than two internal rounds of the AES, or to the entire AES.

In addition, the commonly used technique of substitution block recalculation and masking, as described in the article "An AES Smart Card Implementation Resistant to Power Analysis Attacks" (Herbst, C., Oswald, E., Mangard S., In: Zhou, J., Yung, Mr. Bao, F. (eds.) ACNS 2006. LNCS vol 3989, pp 239-252, Springer, Heidelberg 2006) lessens the advantages of a lighter version in memory of the AES specified in the relevant standard (AES Proposal: Rijndael, Document version 2, Date: Mar. 9, 1999, Joan Daemen, Vincent Rijmen, available at the following address, containing two m the word "amended" csrc.nist.gov/archive/aes/rijndael/Rijndael-ammended.pdf).

For 32-bit (or more) environments, it is possible to accelerate the AES by combining the "SubBytes" and "ShiftRows" operations with "MixColumns" and converting them into a sequence of searches in the LUTs ("look-up tables"). This requires four tables of 256 32-bit entries, for a total of 4096 bytes of memory (one kilobyte per LUT). A round can then be performed using sixteen searches in the LUTs and twelve "exclusive or" operations on 32 bits, followed by four "exclusive or" operations on 32 bits during the "AddRoundKey" step. This technique is described in "Efficient Software Implementation of AES on 32-Bit Platforms", Guido Bertoni, Luca Breveglieri, Pasqualina Fragneto, Marco Macchetti, and Stefano Marchesin, Cryptographic Hardware and Embedded Systems—CHES 2002, Lecture Notes in Computer Science, 2003, Volume 2523/2003, 129-142, DOI: 10.1007/3-540-36400-5_13. However, this technique requires the use of 32-bit processors, which is extremely restrictive (most smart cards use 8-bit processors and are not able to emulate calculations in 32-bit mode with satisfactory performance).

It has been proposed to combine the "SubBytes", "ShiftRows", and "MixColumns" steps in a single round operation as part of a "byte-oriented" approach, which is described in particular at http://code.google.com/p/byte-oriented-aes/ (June 2009). This project does not consider randomization.

The paper "High Data Rate 8-Bit Crypto Processor," Sheikh Muhammad Farhan, Proceedings of the 2004 ISSA Enabling Tomorrow Conference, 2004, Jan. 1, 2004, discloses an AES computation optimized for an 8-bit platform, including a step described as "elimination of shift rows transformation." The explanations given for this "elimination" show that it does not correspond to replacing the consecutive operations "shift rows" and "mix columns" with a single operation, but the execution of the "shift rows" operation is actually just transferred from the crypto-processor to a "FSM controller" management module of the crypto-processor, with the crypto-processor continuing to perform the "mix columns" operation.

The paper "An AES chip with DPA resistance using hardware-based random order execution", BO Yu et al., JOURNAL OF SEMICONDUCTORS, vol. 33 no. 6, Jun. 1, 2012, discloses an AES computation optimized for an 8-bit platform. This document discloses a certain form of randomization of the AES algorithm.

The invention improves the situation.

One aspect of the invention relates to a method for protecting an electronic device, when the electronic device implements a cryptographic algorithm, against side channel attacks, the cryptographic algorithm working with a state array, the cryptographic algorithm being designed to generate, from a current state array, a second state array in which each row is obtained by cyclically shifting the corresponding row of the current state array (which can also be interpreted as a rotation of elements in the row), then to generate, from the second state array, a third state array in which the elements of each column are the result of mixing elements of the corresponding column of the second state array, the method being characterized in that it comprises replacing said two consecutive generations of the respective second and third state array by a secure generation, from the current state array, of a state array equal to the third state array, this secure generation mixing, in a randomized manner, the elements of the current state array that would have been located in a same column of the second state array if said second state array had been generated, in order to produce the corresponding column of the generated state array.

The method is advantageous in that it enables secure implementation of cryptographic algorithms by electronic devices, reducing the risk of side channel attacks. It is particularly advantageous in that it can be used to protect cryptographic algorithms comprising several internal rounds (it can protect more than two rounds, and even all the rounds).

In addition, this method speeds up and simplifies the software implementation of a cryptographic algorithm protected by masking and having an internal structure dictated randomly (randomization). Indirectly incorporating the shift rows operation with the next mix columns operation and modifying the latter so that its result is placed in another array but ordered as if the shift rows operation has been conducted is advantageous. The cost of the shift operation is thus zero, which in itself represents a speed increase, and also allows randomizing it in the same manner as the mix columns operation, as the two are interleaved.

This is also advantageous compared to solutions that offload execution of the shift rows to another component, since this avoids adding complexity to the other component (and also eliminates the need to protect the other component against potential attacks on this isolated shift rows operation). It is thus possible, for example, to reduce the amount of silicon required and the surface area of the electronic component(s) used, reduce communications between components, and/or save resources (such as RAM) on the other component.

The method is also advantageous in that it can protect a lighter memory-resident version of the AES specified in the relevant standard (AES Proposal: Rijndael, Document Version 2 Date: Mar. 9, 1999, referenced above).

One aspect of the invention relates to a computer program comprising a set of instructions which, when executed by a processor of an electronic device, leads the processor to implement a method according to an aspect of the invention.

One aspect of the invention relates to a computer-readable non-transitory storage medium in which a computer program according to an aspect of the invention is stored.

One aspect of the invention relates to an electronic device arranged to implement a cryptographic algorithm working with a state array, the cryptographic algorithm being designed to generate, from a current state array, a second state array in which each row is obtained by shifting the corresponding row of the current state array, then to generate, from the second state array, a third state array in which the elements of each column are the result of mixing elements of the corresponding column of the second state array, the electronic device comprising a protection circuit to protect against side channel attacks, the protection circuit being arranged to replace said two consecutive generations of the respective second and third state array by a secure generation, from the current state array, of a state array equal to the third state array, this secure generation mixing, in a randomized manner, the elements of the current state array that would have been located in a same column of the second state array if said second state array had been generated, in order to produce the corresponding column of the generated state array.

Other features, objects, and advantages of the invention will become apparent from reading the following description of some of its embodiments.

The invention will also be better understood by referring to the drawings, in which.

Figure 1:
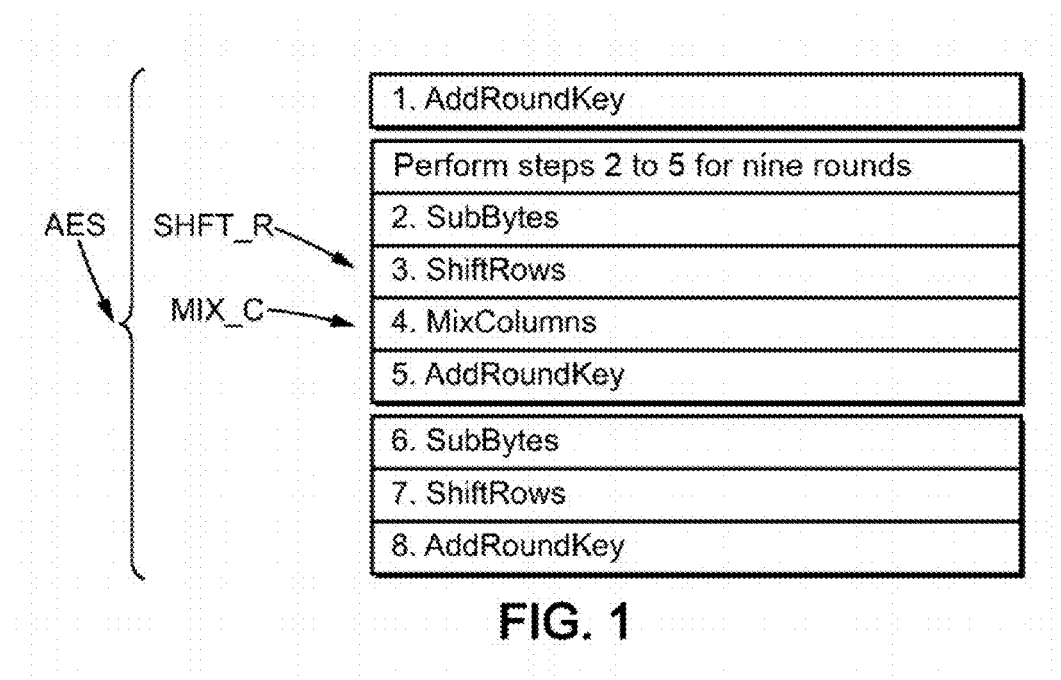
FIG. 1 illustrates the cryptographic algorithm for AES encryption.

FIG. 1 schematically shows the known structure of the cryptographic algorithm for AES encryption, and in particular the steps SHFT_R (step number 3, referred to as "ShiftRows") and MIX_C (step number 4, referred to as "MixColumns").

Figure 2:
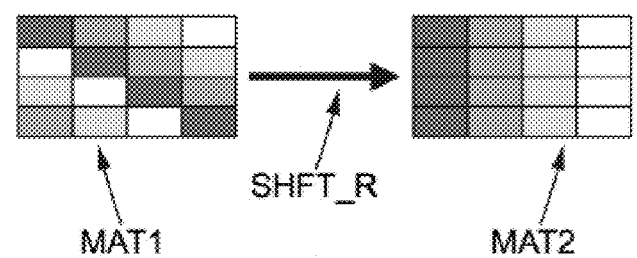
FIG. 2 illustrates the AES "ShiftRows" operation.

FIG. 2 graphically illustrates the known step SHFT_R that transforms a current state array MAT1 into a second state array MAT2. The concept of a second state array is relative to the current state array, assumed to be the first state array in the given context. It is understood, however, that the state array undergoes repeated changes. In particular, the successive steps "ShiftRows" and "MixColumns" are performed nine times in an AES-128 encryption (and up to thirteen times in the case of AES-256). The "second" state array in the final round of the AES is therefore actually the nth version of this state array (which has undergone numerous changes). It can be seen in FIG. 2 that the second state array results from a shift applied to the current state array, and that the elements of the columns of the second state array come from the diagonals of the current state array. These diagonals are the main diagonal and three broken diagonals, a broken diagonal being a pair of rows parallel to the main diagonal and totaling as many elements as the smallest dimension of the table.

Figures 3, 4:
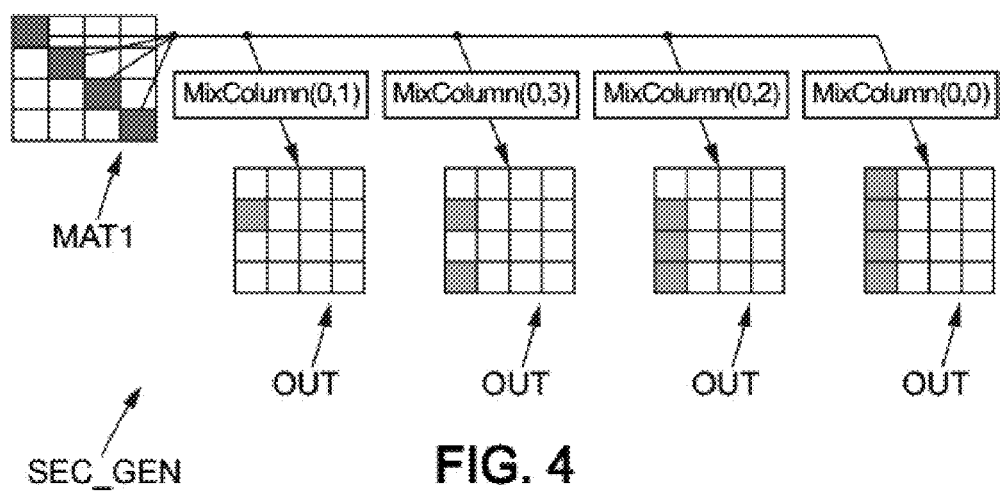
FIG. 3 illustrates the AES "MixColumns" operation.
FIG. 4 illustrates a portion of the method according to one embodiment of the invention.

FIG. 3 illustrates the known MIX_C operation (referred to as "MixColumns") from the AES. One can see that the second state array MAT2 is transformed into a third state array MAT3 by matrix multiplication.

In practice, there are many variants that achieve the same result.

For example, it is possible to consider the columns of the state array as polynomials in $GF(2^8)$ and to multiply them modulo $x^4+1$ by the polynomial: $a(x)=03*x^3+01*x^2+01*x+02$.

FIG. 4 illustrates a portion of the method implemented by an electronic device according to one embodiment of the invention. This is the portion which processes one of the four columns. The method works directly with the current state array MAT1 without the "ShiftRows" operation having been performed.

The method starts by randomly selecting a target column from the contents of the state array (denoted "out") expected from the "MixColumns" operation (which also corresponds to the same column in the state array after the "ShiftRows" operation). In the example shown, the target column is found to be the first column (which corresponds to the main diagonal of state array MAT1, shown in dark gray).

The method then randomly selects an element of this column (in the current example the second element (0,1)), and calculates it.

We therefore have:

out(0,1)=01*MAT1(0,0)+02*MAT1(1,1)+03*MAT1(2,2)+01*MAT1(3,3).

The method then randomly selects another element of this column (in the current example, the fourth element (0,3)), and calculates it.

We therefore have:

out(0,3)=03*MAT1(0,0)+01*MAT1(1,1)+01*MAT1(2,2)+02*MAT1(3,3).

The method then randomly selects another element of this column (in the current example, the third element (0,2)), and calculates it.

We therefore have:

out(0,2)=01*MAT1(0,0)+01*MAT1(1,1)+02*MAT1(2,2)+03*MAT1(3,3).

The method lastly selects the remaining element of the column (in the current example, the first element (0,0)), and calculates it.

We therefore have:

out(0,0)=02*MAT1(0,0)+03*MAT1(1,1)+01*MAT1(2,2)+01*MAT1(3,3).

This method of calculating in a random order is advantageous in that it is misleading to side channels attempting to determine what the electronic device is calculating.

The method continues in a manner not shown in FIG. 4, by the random selection and processing of another column (similar to the above processing), then again by the random selection and processing of another column, and finally by the selection and processing of the remaining column. At this stage, the "out" state array has been completely calculated and it is equal to the state array MAT3 that could be calculated by a less safe conventional AES algorithm.

Figure 5:
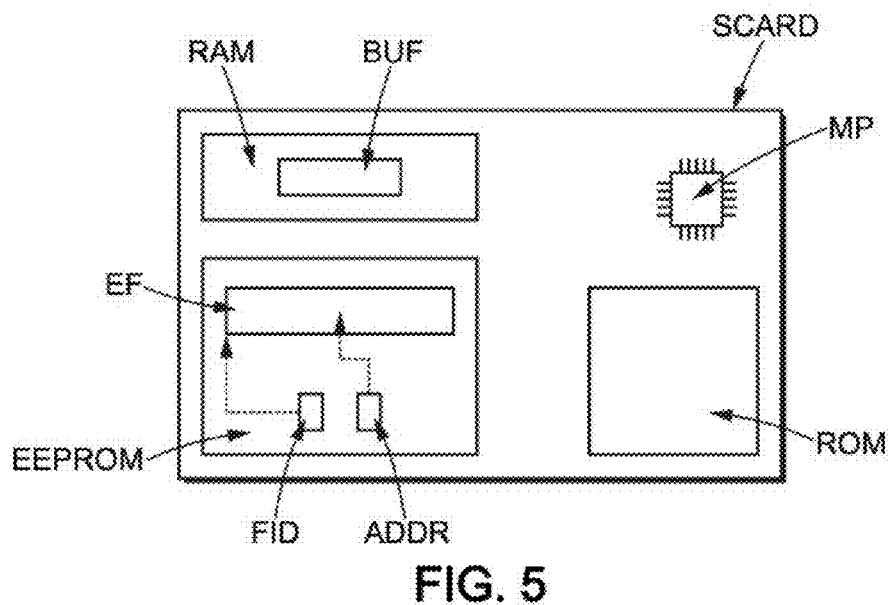
FIG. 5 illustrates an electronic device according to one embodiment of the invention.

FIG. 5 shows a smart card SCARD according to one embodiment of the invention. This smart card has a microprocessor MP, random access memory RAM (including a buffer BUF), read-only memory ROM, and rewritable memory EEPROM (storing a file EF for which an identifier FID and an address ADDR are also stored). The ROM holds software which, when executed by the microprocessor MP, implements a method according to an embodiment of the invention. A smart card is one possible example of an electronic device for which the invention is particularly advantageous, considering its numerous applications in the field of cryptography (SIM cards authenticating a mobile phone user for an operator, bank cards authenticating their holders during a financial transaction, health insurance cards, etc.). However, the invention is applicable to any other electronic device, such as an electronic passport, an electronic visa, an electronic driver's license, a secure USB key, a secure MMC card, a secure token, etc. The invention may also be implemented on a personal computer, a server, an SSL accelerator, etc. The majority of personal computers are not secure in comparison to a secure device such as a smart card. This makes these computers vulnerable to attacks that are much simpler to implement than the attacks which the invention protects against, such as pure software-based attacks. Such software attacks (viruses, Trojans, etc.) can often be carried out remotely without requiring physical access. It may seem absurd to attempt to protect against complex and restrictive side channel attacks when an attacker on another continent could take control of a computer remotely and extract critical information in a much simpler way that is much less dangerous for the attacker (no intrusion, no theft of a device, etc.). However, some personal computers (for example in military environments) are highly protected against pure software-based attacks, and in this context it is advantageous to protect them against side channel attacks as well.

Figure 6:
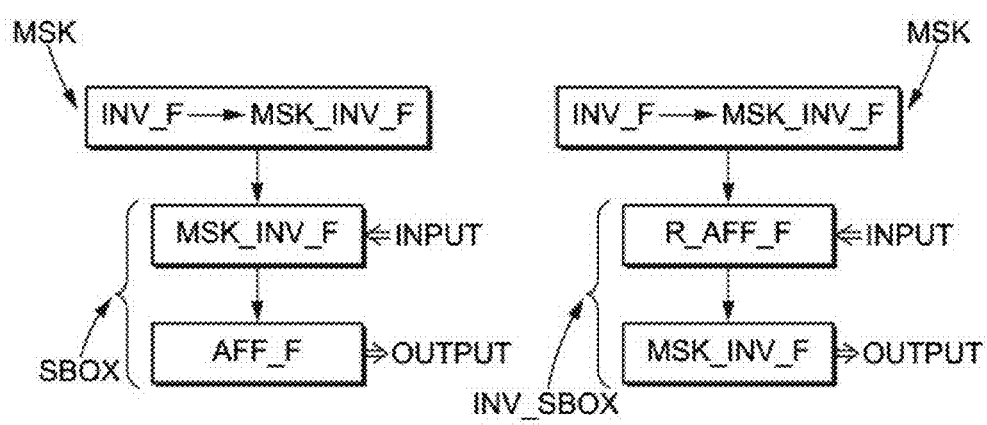
FIG. 6 illustrates an optional portion of the method which can supplement various embodiments of the invention.

FIG. 6 schematically illustrates the operation of methods according to two possible embodiments.

On the left, a first method begins by masking (step MSK) the AES inverse function INV_F using a random number, to produce a masked inverse function MSK_INV_F. The random number may come from a pseudo-random generator of the electronic device relying on hardware such as an analog-to-digital converter digitizing an analog noise measured in the electronic device and mathematically processing it (for example using a cryptoprocessor of the electronic device). One possible means of masking the inverse function is to implement this inverse function as a table INV_F and to generate a masked inverse function table MSK_INV_F using the following algorithm (for a table of 256 elements), where m and w are random bytes and the '+' symbol denotes the "exclusive or" operation:

For i from 0 to 255:

MSK_INV_F[i]=INV_F[i+m]+w

Next, the method applies a masked substitution box SBOX to the input data INPUT, and generates the corresponding output OUTPUT. The implementation of the masked substitution box consists of applying the masked inverse function MSK_INV_F to the input data INPUT, then applying to the result of this masked inversion the AES affine function AFF_F (unmasked). This obtains a globally masked substitution box.

Similarly, on the right of FIG. 6, a second method begins by masking (step MSK identical to step MSK of the above method) the AES inverse function INV_F to produce a masked inverse function MSK_INV_F. Next, the method applies a masked inverse substitution box INV_SBOX to the input data INPUT, and generates the corresponding output OUTPUT. The implementation of the masked inverse substitution box consists of applying the reciprocal function R_AFF_F of the AES affine function AFF_F (unmasked) to the input data INPUT and then applying the masked inverse function MSK_INV_F to the result of this function. This obtains a globally masked inverse substitution box.

According to one embodiment, a method for protecting an electronic device SCARD is arranged to protect (against side channel attacks) the electronic device when the electronic device implements a cryptographic algorithm. The electronic device may be in particular a smart card, but also any other suitable equipment capable of implementing a cryptographic algorithm. The cryptographic algorithm may be the AES algorithm, specified in document FIPS-197 ("Federal Information Processing Standards Publication 197") dated 26 Nov. 2001 (published by the NIST, an agency of the United States Department of Commerce). However, it can also be any other Rijndael variant (AES is a Rijndael variant). There are many variants of the Rijndael algorithm, depending for example on the values of the parameters Nk (determining the length of the key), Nb (determining the block size), and Nr (determining the number of rounds). AES includes only three variants, which are variant AES-128 (Nk=4, Nb=4, Nr=10), variant AES-192 (Nk=6, N=4, Nr=12), and variant AES-256 (Nk=8, N=4, Nr=14), but other possible combinations of Rijndael parameters can also be considered.

It is more generally possible to protect, using the method, the implementation of any cryptographic algorithm working with a state array, the cryptographic algorithm being designed to generate (during a step denoted SHFT_R for "ShiftRow"), from a current state array MAT1, a second state array MAT2 in which each row is obtained by shifting the corresponding row of the current state array MAT1, and then to generate (during a step denoted MIX_C for "MixColumns") from the second state array MAT2, a third state array MAT3 in which the elements of each column result from mixing elements from the corresponding column of the second state array MAT2.

The state array is, for example, a matrix of four rows and four columns, each element being represented by a byte.

The method comprises the replacement of said two consecutive generations (SHFT_R and MIX_C) of the respective second and third state array (MAT2 and MAT3) by a secure generation SEC_GEN, from the current state array MAT1, of a state array equal to the third state array MAT3. This avoids creating an intermediate version of the state array (version MAT2). This is particularly advantageous because the creation of this intermediate version could leak information via a side channel. Indeed, a write to RAM (or even more so to EEPROM) is often spotted more easily than, for example, a simple read operation, or a read or write operation in a processor register. This secure generation SEC_GEN mixes (which corresponds to the "mix" in "mix columns"), in a randomized manner (as explained above, the randomization consists of processing in random order), the elements of the current state array MAT1 that would be found in the same column of the second state array MAT2 if such had been generated, in order to produce the corresponding column in the generated state array.

Thus, the product does not alter the result determined by the cryptographic algorithm, but calculates it in a different, more secure manner. The randomization (processing the different elements of the state array in a random order) also increases security.

The method may be implemented using a set of instructions constituting a computer program for execution by a processor of the electronic device. However, it could also be implemented using a dedicated electronic circuit embedded in the electronic device, such as an ASIC, FPGA (or the variants PAL, EPLD, PLD, CPLD, PLA, etc.) properly configured (for example in VHDL), or even dedicated electronics that are custom-designed.

According to one embodiment, each element of a state array is identified by an index. For example, when considering a state array of 4*4 bytes (as used in the AES), each of the elements can be identified by an index (i,j). Each element can be denoted $T_{i,j}$, where $T_{i,j}$ denotes the byte located in the $i^{th}$ row (rows being numbered from i=0 to i=3) and the $j^{th}$ column (columns being numbered from j=0 to j=3). It is possible to use other forms of indices.

For example, it is possible to use an index k=i+4*j (or more generally k=i+TL*j where TL denotes the size of a row by its number of elements). It is also possible to use an index k=j+4*i (or more generally k=j+TC*i where TC denotes the size of a column by its number of elements). It is also possible to use as an index the absolute or relative address of the element (if the element occupies several addresses, for example in the case of a 16-bit element where the electronic device uses a system that addresses the bytes individually, then we may have for example an index in the form k=2*(i+TL*j)).

Each element of the state array is thus identified by an index with a single variable k, or with multiple variables (for example two variables i and j).

The mixing of the elements of the current state array MAT1 by secure generation SEC_GEN is based on an index conversion function that takes as its input parameter an index (i,j) of a virtual element of the second state array MAT2 and outputs the index (ic,jc) of the corresponding element in the current state array MAT1. The term "virtual elements" is used because state array MAT2 has not been generated (does not exist). The virtual element is therefore an element that does not exist as such (in state array MAT2 which itself does not exist), but which would be equal (if state array MAT2 had been generated) to a corresponding element in state array MAT1.

According to one embodiment, the shift applied to a row during generation SHFT_R of the second state array MAT2 is a shift of n elements, n indicating the row number, the first row being numbered n=0 (for example a shift as represented in FIG. 2). State array MAT2 is not generated, but its theoretical content is still important as was noted above.

Thus, if we consider the example of a state array of 4*4 bytes (used in the AES), its elements being denoted $T_{i,j}$ where $T_{i,j}$ indicates the byte located in the $i^{th}$ row (rows being numbered from i=0 to i=3) and in the $j^{th}$ column (columns being numbered from j=0 to j=3), then the secure generation SEC_GEN mixes the elements of the diagonal $T_{k,k}$ (k=0 to 3) of the current state array MAT1 instead of the first column (elements $T_{k,0}$ where k=0 to 3) of the second state array MAT2 because if the second state array MAT2 had been generated, its first column would have been composed of the elements of the diagonal of the current state array MAT1.

More generally, the secure generation SEC_GEN mixes the elements $T_{k,(k+n) \bmod 4}$ (k=0 to 3 and n being constant and between 0 and 3, mod denoting the modulo 4 operation, meaning the remainder of the integer division by 4) of the current state array MAT1 instead of the $n^{th}$ column (elements $T_{k,n}$ for k=0 to 3 and n being constant and between 0 and 3) of the second state array MAT2 (if it had been generated), because if this second state array MAT2 had been generated, its $n^{th}$ column would have consisted of $T_{k,(k+n) \bmod 4}$ elements of the current state array MAT1. This corresponds to the "ShiftRows" operation of the AES.

Of course, other types of shifts are possible, including the shift corresponding to the "InvShiftRows" operation of the AES (used in decryption). It would also be conceivable for a cryptographic algorithm to define some phi bijection of [0; NL-1] into [0; NL-1] (NL denoting the number of rows in the state array) and for the shift applied to row number n (n being between 0 and NL-1) to be a shift of phi(n) elements.

According to one embodiment, the mixing of elements of a column of the second state array MAT2 in order to obtain an element of the third state array MAT3 during its generation MIX_C is a linear combination of these elements. The scalars used for the linear combination may be dependent on the row where the element of the third state array MAT3 is located.

For example, the mixing may be the result of the AES "MixColumns" operation, or of the "InvMixColumns" operation (in the case of a decryption operation).

The "MixColumns" and "InvMixColumns" operations are the same as multiplying the state array MAT2 by a matrix containing the scalars to use for the linear combinations, as shown in the following two equations.

$$MAT3 = MixColumns(MAT2) = \begin{pmatrix} 02 & 03 & 01 & 01 \\ 01 & 02 & 03 & 01 \\ 01 & 01 & 02 & 03 \\ 03 & 01 & 01 & 02 \end{pmatrix} * MAT2$$

$$MAT3 = InvMixColumns(MAT2) = \begin{pmatrix} 0e & 0b & 0d & 09 \\ 09 & 0e & 0b & 0d \\ 0d & 09 & 0e & 0b \\ 0b & 0d & 09 & 0e \end{pmatrix} * MAT2$$

Of course, other linear combinations are possible (the above matrices could use different coefficients).

The method does not perform the calculations in the manner shown in the above two equations (corresponding to how the non-secure cryptographic algorithm operates), as that would require the existence of the second state array MAT2. As indicated above, the method works directly with the current state array MAT1.

For example, "IndConv" is used to denote an index conversion function according to one embodiment, where IndConv((i,j))=(ic,jc) such that MAT2(i,j)=MAT1(ic,jc) for all (i,j) in [0; NL]*[0; NC] (NL and NC respectively denoting the number of rows and the number of columns in the state array). This "IndConv" function can be stored in ROM, which is generally less susceptible to side channel attacks than other types of memory (such as RAM, EEPROM, or Flash, or more generally any rewritable memory that would be necessary for storing the second state array MAT2).

The method can then replace the two consecutive generations of state arrays MAT2 and MAT3 according to the conventional algorithm, for example according to an AES encryption algorithm represented by the following pseudocode:

```
MAT2 = ShiftRows(MAT1) // generate MAT2 from MAT1
INIT(MAT3) // initialize MAT3 to zero
for i=0...3, for j=0...3, for k=0...3
    MAT3(i,j) += COEFF(i,k)*MAT2(k,j)
// COEFF is the matrix of scalar coefficients of MixColumns
``` by a modified algorithm having the following pseudocode:

```
INIT(out) // initialize the table of expected results,« out» , to zero
RAND(bl,bc,b) // randomly create three bijections of [0;3] in [0;3]
for i=0...3, for j=0...3, for k=0...3
    out(bl(i),(bc(j)) += COEFF(bl(i),b(k))*MAT1(IndConv(b(k),bc(j)))
```

Processing the elements of the state array in random order (using the randomly selected bijections bl, bc, and bm) provides further security for the cryptographic algorithm by rendering side channel observations even more difficult to carry out. This random processing is, of course, possible on state array sizes other than 4*4.

It is also possible to use a modified algorithm represented by the following pseudocode:

```
INIT(out) // iniitialize the table of expected results,« out» , to zero
RAND(bsq) // randomly create a bijection of [0;3]² in [0;3]²
RAND(b) // randomly create a bijection of [0;3] in [0;3]
for i=0...3, for j=0...3, for k=0...3
    out(bsq(i,j)) +=
    COEFF(l(bsq(i,j)),b(k))*MAT1(IndConv(b(k),c(bsq(i,j))))
// l (row) is defined as the function l : (i,j) -> i
// c (column) is defined as the function c : (i,j) -> j
```

This alternative version even further randomizes the calculation of the AES because it removes the column by column processing of the previous version (which processes elements randomly but column by column, even if the columns are processed in random order). This random processing is, of course, possible on state arrays of sizes other than 4*4. This alternative version protects against more complicated attacks (not difficult to implement)

Furthermore, this method (in its different variants described above) speeds up and simplifies the software implementation of a cryptographic algorithm protected by masking (it is thus possible to work with masked data rather than unhidden data).

According to one embodiment, a computer program comprises a set of instructions which, when executed by a processor MP of an electronic device SCARD, leads the processor MP to implement a method according to an embodiment of the invention.

The electronic device may thus be a smart card SCARD, comprising a microcontroller, the microcontroller comprising a processor MP connected to other components such as one or more memories (RAM, EEPROM, Flash, ROM, etc.), I/O components, etc. The computer program may be written in assembly language, or possibly in a higher-level language (such as C, for example) that is compiled and the resulting assembly code possibly being fine-tuned for optimization and/or security.

According to one embodiment, a computer-readable non-transitory storage medium stores a computer program according to one embodiment. In particular, this storage medium may be a memory (for example EEPROM, Flash, or ROM), possibly embedded in a system such as a USB key, a smart card, a memory card, etc.

According to one embodiment, an electronic device SCARD is arranged to implement a cryptographic algorithm. The cryptographic algorithm may be for example AES, more generally Rijndael, or any cryptographic algorithm working with a state array and designed to generate (during a step SHFT_R), from a current state array MAT1, a second state array MAT2 in which each row is obtained by shifting the corresponding row of the current state array MAT1, and then to generate (during a step MIX_C) from the second state array MAT2 a third state array MAT3 in which the elements of each column result from mixing the elements of the corresponding column of the second state array MAT2. Other cryptographic algorithms which can be protected according to one embodiment are, for example, LED and KLEIN encryption algorithms, which are based on the AES structure (structure known as SPN, for Substitution-Permutation Network, where each round is divided into the operations SubBytes, ShiftRows, MixColumns, and AddRoundKey as in AES, but the matrices and Sbox are not the same). The LED algorithm is described in the article "The LED Block Cipher" by Jian Guo, Thomas Peyrin, Axel Poschmann, and Matt Robshaw, published in B. Preneel and T. Takagi (Eds.): CHES 2011, LNCS 6917, pp. 326-341, © Springer-Verlag Berlin Heidelberg 2011. The KLEIN algorithm is described in the article "KLEIN: A New Family of Lightweight Block Ciphers" by Zheng Gong, Svetla Nikova, and Yee-Wei Law, presented at RFIDSec 2011. The electronic device SCARD comprises a circuit MP to protect against side channel attacks. The protection circuit MP is arranged to replace the two consecutive generations (SHFT_R and MIX_C) described above, of the respective second and third state array (MAT2 and MAT3), by a secure generation SEC_GEN, from the current state array MAT1, of a state array equal to the third state array MAT3. This secure generation SEC_GEN mixes, in a randomized manner, the elements of the current state array MAT1 that are found in a same column of the second state array MAT2 (if such had been generated) in order to produce the corresponding column of the generated state array.

The protection circuit MP may be a processor of the user electronic device associated with memory where a program adapted for implementation of the method by the processor is stored. However, it could also be a dedicated electronic circuit embedded in the electronic device, such as an ASIC, an FPGA (or the variants PAL, EPLD, PLD, CPLD, PLA, etc.) properly configured (for example in VHDL), or even dedicated electronics that are custom-designed. It is thus possible to protect a hardware implementation of a cryptographic algorithm.

According to one embodiment, as each element of a state array is identified by an index, the protection circuit MP is arranged to mix elements of the current state array MAT1 by secure generation SEC_GEN based on an index conversion function that takes as its input parameter an index (i,j) of a virtual element of the second state array MAT2 and outputs the index (ic,jc) of the corresponding element in the current state array MAT1. The variants described for the method also apply to the electronic device.

According to one embodiment, the shift applied to a row during generation SHFT_R of the second state array MAT2 is a shift of n elements, n denoting the row number, the first row being numbered n=0. The variants described for the method also apply to the electronic device.

According to one embodiment, the mixing of elements of a column of the second state array MAT2 in order to obtain an element of the third state array MAT3 during its generation MIX_C is a linear combination of these elements. The variants described for the method also apply to the electronic device.

According to one embodiment, the scalars used for the linear combination are dependent on the row where the element of the third state array is located. The variants described for the method also apply to the electronic device.

As will be explained below, the preceding embodiments may be supplemented by a memory optimization method during execution of the cryptographic algorithm.

According to one embodiment, a method optimizes the use of the memory MEM (which is rewritable memory) of an electronic device SCARD (for example a smart card) when the electronic device implements a cryptographic algorithm, while protecting it against physical attacks. The protection comes from masking with a substitution box SBOX and an inverse substitution box INV_SBOX.

According to one embodiment, the cryptographic algorithm is the AES algorithm. However, the cryptographic algorithm may more generally be any Rijndael algorithm other than the Rijndael algorithms selected for the AES, and even any cryptographic algorithm implementing a substitution box SBOX comprising an inverse function INV_F followed by an affine function AFF_F and an inverse substitution box INV_SBOX comprising the reciprocal function R_AFF_F of the affine function AFF_F followed by the inverse function INV_F.

In the AES case, the inverse function is the multiplicative inverse in the finite group $GF(2^8)$ defined in the AES, and the affine function is the affine function of the AES, namely the function which associates byte B with byte B' such that:

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}.$$

The method generates a masked inverse function MSK_INV_F by masking the inverse function INV_F (which protects both the substitution box and the inverse substitution box). According to one embodiment, the method does not mask either the affine function AFF_F or the reciprocal function R_AFF_F of the affine function AFF_F.

The masked inverse function INV_F cannot be stored in non-rewritable memory (such as ROM), since by definition it is defined randomly during use of the method. It is therefore generated from the inverse function INV_F, and then stored in the memory MEM (which is rewritable memory).

According to one embodiment, the inverse function INV_F, the affine function AFF_F, and the reciprocal function R_AFF_F of the affine function AFF_F are stored in a memory of the electronic device other than its memory MEM. For example, they are stored in non-rewritable memory (for example ROM). According to one embodiment, these functions are constant and can therefore be set during manufacture (once and for all, in ROM). They may also be stored in rewritable non-volatile memory (such as flash memory or EEPROM for example) other than the memory MEM. They can then be stored during configuration (and possibly during reconfiguration) of the electronic device. In fact, it is increasingly common to use rewritable non-volatile memory (often flash memory) rather than ROM for the operating system and the constant data of certain electronic devices (such as smart cards), to increase flexibility in manufacturing the electronic device (it is not necessary to mask a ROM component at the factory every time a change is made to an element located in ROM and not editable by soft-mask).

The method can thus use the affine function AFF_F and the reciprocal function R_AFF_F of the affine function AFF_F (during use of a substitution box or inverse substitution box) without consuming additional memory MEM, or possibly consuming a marginal amount of memory MEM compared to the resulting memory optimization. This possible marginal amount of memory that is "lost" may be related, for example, to calling a function (AFF_F or R_AFF_F) which may for example, depending on the implementation, result in saving certain information in a stack in memory MEM (for example two bytes encoding the return address to use to continue execution once AFF_F or R_AFF_F has been executed, etc.). The equivalent of this information would not necessarily have been required (as a record in memory MEM) in a prior art implementation which masks the entire substitution box as a table. But in any case, the possible loss of a few bytes (two bytes in the above example) is negligible compared to the 160 or even 256 bytes of memory MEM the method saves for an AES-128 decryption compared to known secure decryption methods.

The data manipulated by the affine function AFF_F (and by the reciprocal affine function R_AFF_F) are preferably masked. It is not necessary, however, to modify the affine function or the reciprocal affine function although they were originally designed for unmasked data. These functions are linear. It is therefore possible to determine, from the result of the affine function (respectively the reciprocal affine function) applied to a masked data item and from the value of the mask, the result of the affine function (respectively the reciprocal affine function) applied to the unmasked data. Indeed, for a linear function L, a data item x, and a mask m, we have $L(x+m)=L(x)+L(m)$ and therefore $L(x)=L(x+m)+L(m)$ (the '+' operation indicating an "exclusive or").

According to one embodiment, the memory MEM is volatile memory, such as RAM, or more specifically SRAM, DRAM, MRAM, DDRAM, SDRAM, RDRAM, DDR SDRAM, DDR2 SDRAM, DDR3 SDRAM, XDR DRAM, etc. The volatile memory of the electronic device is often the most critical memory because there is so little of it (much less than the non-volatile memory). For example, there are often only a few hundred or thousand bytes of RAM compared to tens of thousands of bytes of EEPROM in a smart card. Similarly, there are often only a few gigabytes of RAM in a server compared to terabytes of storage in a hard drive of a server. RAM is usually very fast both for reads and writes but requires constant power, as loss of power results in the loss of the stored data.

In another embodiment, the memory MEM comprises, for the implementation of the cryptographic algorithm, rewritable non-volatile memory (such as EEPROM or flash memory) to store temporary information such as the extended key, or such as the masked inverse function. However, writing to such memory is much slower and more complex than writing to volatile memory such as RAM. This leads to substantially reduced performance in terms of execution speed. It is also likely to facilitate side channel attacks. In addition, the number of writes to rewritable non-volatile memory is usually limited. For example, some EEPROM memory is only guaranteed for 100,000 writes. This number of writes (100,000) could be reached in certain applications, so that areas reaching their utilization threshold must no longer be used and are therefore lost. This would mean a corresponding increase in the consumption of non-volatile memory. In one embodiment, the use of non-volatile memory MEM therefore supplements the use of RAM included in the memory MEM, RAM that may prove to be of insufficient size (depending on the applications being executed, etc.). The memory MEM can thus combine RAM and (when the RAM is full) non-volatile memory (for example EEPROM or flash). For this purpose, the method can use for example a technique similar to known techniques for swapping between the RAM and the hard drive of a conventional personal computer (a page in RAM seeing little use is temporarily copied to the hard drive to free up this page). Depending on the case, it may be possible, instead of making a swap, to simply use the non-volatile memory as a slower and more restrictive extension of the volatile memory. According to one embodiment, the non-volatile memory of the memory MEM can be magnetic storage (for example a hard drive) and can then implement a conventional swap technique. According to one embodiment, the memory MEM comprises a physical non-volatile memory component. According to one embodiment, the memory MEM comprises logical non-volatile memory which constitutes a logical subset of a given physical non-volatile memory. For example, a 64 Kb EEPROM chip of the electronic device can be divided into three parts. The first 4 KB part can be allocated to the memory MEM. A second 16 KB part can be allocated to soft-masks (fixing bugs in an operating system stored in ROM, disabling certain functions of the operating system, or additional features for the operating system). A third 44 KB part (the main part) can be allocated to a user storage function of the electronic device (equivalent to a hard drive in a conventional computer) where it is possible for example to create directories and subdirectories (for example according to ISO-7816-4), or to save Java Card applets or data files. The three parts can, of course, be any sizes.

According to one embodiment, the method comprises a key expansion phase using the substitution box SBOX. The key expansion phase is implemented during the course of an encryption or decryption (encryption or decryption performed using the cryptographic algorithm). This maximizes the resulting optimization of the masking of the inverse function (excluding the affine and the reciprocal of the affine functions, which are not masked), particularly in the case where the method implements a decryption operation.

A comparison between two known techniques and a method according to one particular implementation of the embodiment described above is represented in the following table:

| | Memory used (encryption) | Memory used (decryption) | Masking times |
|---|---|---|---|
| Full masked expansion (separate) | 432 bytes | 432 bytes | 1 |
| Progressive masked expansion (parallel) | 272 bytes | 528 bytes | 2 |
| Embodiment (parallel, progressive, masked expansion) | 272 bytes | 272 bytes | 1 |

The first known technique begins by performing a full expansion (which requires 176 bytes) and then a full encryption using a masked substitution box (256 bytes), for a total of 176+256=432 bytes. The first technique also allows a decryption where first a full expansion is performed (which requires 176 bytes) and then a full decryption using a masked inverse substitution box (256 bytes), for a total of 176+256=432 bytes.

The second known technique performs a key expansion and an encryption in parallel. At each iteration, the expansion requires 16 bytes (for the 16 bytes among the 176 that are being generated), plus 256 bytes for the masked substitution box, for a total of 16+256=272 bytes. In parallel, the second technique performs the encryption based on the 16 bytes of the key that were just generated, which requires 256 bytes for the encrypted substitution box (although these 256 bytes were already allocated so it does not change the memory requirements). The second known technique also allows performing a key expansion and a decryption in parallel. At each iteration, the expansion requires 16 bytes (for the 16 bytes among the 176 that are being generated), plus 256 bytes for the masked substitution box, for a total of 16+256=272 bytes. In parallel, the second technique performs the decryption based on the 16 bytes of the key that were just generated, which requires 256 bytes for the encrypted inverse substitution box. These 256 bytes are in addition to the 272 bytes required for the expansion, which implies a memory requirement of 272+256=528 bytes.

Finally, the particular implementation of the embodiment described above is applied to AES-128. A progressive masked expansion is performed, plus a parallel encryption (or decryption) using a substitution box (or inverse substitution box) masked by the masking of the inverse function. This only requires 272 bytes.

According to one embodiment, the masked inverse function MSK_INV_F, the affine function AFF_F, and the reciprocal function R_AFF_F of the affine function AFF_F are implemented in the form of tables. According to one embodiment, these three functions are applied to a byte and return a byte. This may involve, for example, tables of 256 bytes each, the first byte containing the result of applying the function concerned to byte 00, the second byte containing the result of applying the function concerned to byte 01, and so on, to the 256th byte containing the result of applying the function concerned to byte FF (255 in hexadecimal). According to one embodiment, the method is implemented as software stored elsewhere than in the memory MEM (for example in non-volatile memory such as EEPROM or flash memory, or even non-rewritable memory such as ROM). The method may provide fixed addresses for the three tables (or for only some of them). For example, the method may provide two predetermined addresses in ROM (or EEPROM or flash memory other than the memory possibly comprised in memory MEM) for the tables representing the affine function AFF_F and the reciprocal function R_AFF_F of the affine function AFF_F, and a predetermined address in memory MEM for storing the table corresponding to the masked inverse function MSK_INV_F. This saves the memory MEM which would required to store the value of these addresses. In addition, the use of a table allows the possibility of eliminating a function call. The software implementing the method may, for example, read the result of applying the masked inverse function to a byte by directly reading the memory MEM at the predefined address of the table representing this masked inverse function plus the value of the byte. For example, if the table is stored at address $12F0, the method can obtain the masked inverse of the byte having the value B7 by reading the contents of address $13A7.

According to one embodiment, a method makes use, within the same session, of several methods for encrypting or decrypting data using a method according to one of the previous embodiments.

The session may correspond to the interval between when the electronic device is powered on and when it is powered off (for example introduction of a smart card into a reader, transaction, and then removal of the smart card). The session may also be a logical session, for example a session following the PKCS#11 command C_OpenSession( ) which opens a cryptographic session with a PKCS#11 compatible electronic device (which could be a smart card or a larger computer, such as a server or HSM (Hardware Security Module)).

The encryption and decryption operations may be implemented in a multitasking environment. This could involve cooperative multitasking ("fake multitasking") or preemptive multitasking ("true multitasking"). In a cooperative multitasking system, an electronic device provides various functions (cryptographic functions in the current case), and it is possible to call multiple functions in parallel if the various functions will return control. In preemptive multitasking, the operating system (rather than the function) allocates available time slices of the processor (or even multiple processors, in the case of a multiprocessor electronic device) to each function (task).

Some electronic devices, although they have a large amount of memory MEM (for example significant RAM), may have memory limitations due to the large number of parallel computations needed to implement the cryptographic algorithm. This may be the case, for example, in an HSM or a TLS/SSL accelerator. Although in such cases it is possible to mask the inverse function one time only for all current instances, it may be preferable from a security point of view to use a different mask for each instance, the method then being advantageous in the memory it saves.

According to one embodiment, an electronic device SCARD comprises a memory MEM and a memory optimization circuit MP. The circuit MP is arranged, when the electronic device SCARD implements a cryptographic algorithm while protecting it against physical attacks by masking with a substitution box SBOX and an inverse substitution box INV_SBOX (the substitution box SBOX comprising a inverse function INV_F followed by an affine function AFF_F, the inverse substitution box INV_SBOX comprising the reciprocal function R_AFF_F of the affine function AFF_F followed by the inverse function INV_F), to generate a masked inverse function MSK_INV_F by masking the inverse function INV_F.

The protection circuit MP may be a processor of the user's electronic device associated with non-volatile memory that holds software adapted for implementation of the method by the processor. However, it could also be a dedicated electronic circuit embedded in the electronic device, such as an ASIC, an FPGA (or the variants PAL, EPLD, PLD, CPLD, PLA, etc.) properly configured (for example in VHDL), or even dedicated electronics that are custom-designed. It is thus possible to protect a hardware implementation of a cryptographic algorithm.

According to one embodiment, the electronic device is arranged to implement a key expansion phase (for example by the circuit MP) using the substitution box SBOX during the course of an encryption or decryption performed using the cryptographic algorithm.

According to one embodiment, the electronic device is arranged to implement (for example by the circuit MP) the masked inverse function MSK_INV_F, the affine function AFF_F, and the reciprocal function R_AFF_F of the affine function AFF_F, in the form of tables.

According to one embodiment, the electronic device is arranged to implement (for example by the circuit MP) several methods for encrypting or decrypting data within the same session while minimizing memory MEM consumption (by using a method according to the invention).

Of course, the present invention is not limited to the embodiments described above in the examples; it extends to other variants.

Thus, a method has been described above for securing an AES encryption step, but it is possible to secure an AES decryption step in the same manner. Moreover, some of the embodiments described concern the AES algorithm, but the invention applies to other types of cryptographic algorithms.

In addition, the method of the invention does not exclude the use of other methods. For example, it is possible to combine the method of the invention with other countermeasures such as the additive masking of the prior art.

The invention claimed is:

1. A protection method for protecting an electronic device (SCARD), when the electronic device implements a cryptographic algorithm (AES), against side channel attacks, the cryptographic algorithm (AES) working with a state array (MAT1, MAT2, MAT3), the cryptographic algorithm (AES) being designed to generate (SHFT_R), from a current state array (MAT1), a second state array (MAT2) in which each row is obtained by shifting the corresponding row of the current state array (MAT1), then to generate (MIX_C), from the second state array (MAT2), a third state array (MAT3) in which the elements of each column are the result of mixing elements of the corresponding column of the second state array (MAT2), wherein the method comprises replacing said two consecutive generations (SHFT_R, MIX_C) of the respective second and third state array (MAT2, MAT3) by a secure generation (SEC_GEN), from the current state array (MAT1), of a state array equal to the third state array (MAT3), this secure generation (SEC_GEN) mixing, in a randomized order, the elements of the current state array (MAT1) that would have been located in a same column of the second state array (MAT2) if said second state array had been generated, in order to produce the corresponding column of the generated state array.

2. The protection method according to claim 1, wherein each element of a state array having been identified by an index, the mixing of the elements of the current state array (MAT1) by secure generation (SEC_GEN) is based on an index conversion function that takes as its input parameter an index (i,j) of a virtual element of the second state array (MAT2) and outputs the index (ic,jc) of the corresponding element in the current state array (MAT1).

3. The protection method according to claim 1, wherein the shift applied to a row during generation (SHFT_R) of the second state array (MAT2) is a shift of n elements, n indicating the row number, the first row being numbered n=0.

4. The protection method according to claim 1, wherein the mixing of elements of a column of the second state array (MAT2) in order to obtain an element of the third state array (MAT3) during its generation (MIX_C) is a linear combination of these elements.

5. The protection method according to claim 4, wherein the scalars used for the linear combination are dependent on the row where the element of the third state array (MAT3) is located.

6. The protection method according to claim 1, wherein a shift rows operation and a mix columns operation are randomized.

7. A computer-readable non-transitory storage medium storing a set of instructions which, when executed by a processor of an electronic device, causes the processor to implement a protection method for protecting an electronic device, when the electronic device implements a cryptographic algorithm, against side channel attacks, the cryptographic algorithm working with a state array, the cryptographic algorithm being designed to generate, from a current state array, a second state array in which each row is obtained by shifting the corresponding row of the current state array, then to generate, from the second state array, a third state array in which the elements of each column are the result of mixing elements of the corresponding column of the second state array, the method comprising replacing said two consecutive generations of the respective second and third state array by a secure generation, from the current state array, of a state array equal to the third state array, this secure generation mixing, in a randomized order, the elements of the current state array that would have been located in a same column of the second state array if said second state array had been generated, in order to produce the corresponding column of the generated state array.

8. An electronic device (SCARD) arranged to implement a cryptographic algorithm (AES) working with a state array, the cryptographic algorithm (AES) being designed to generate (SHFT_R), from a current state array (MAT1), a second state array (MAT2) in which each row is obtained by shifting the corresponding row of the current state array (MAT1), then to generate (MIX_C), from the second state array (MAT2), a third state array (MAT3) in which the elements of each column are the result of mixing elements of the corresponding column of the second state array (MAT2), the electronic device (SCARD) comprising a protection circuit (MP) to protect against side channel attacks, the protection circuit (MP) being arranged to replace said two consecutive generations (SHFT_R, MIX_C) of the respective second and third state array (MAT2, MAT3) by a secure generation (SEC_GEN), from the current state array (MAT1), of a state array equal to the third state array (MAT3), this secure generation (SEC_GEN) mixing, in a randomized order, the elements of the current state array (MAT1) that would have been located in a same column of the second state array (MAT2) if said second state array had been generated, in order to produce the corresponding column of the generated state array.

9. The electronic device (SCARD) according to claim 8, wherein, each element of a state array being identified by an index, the protection circuit (MP) is arranged to mix elements of the current state array (MAT1) by secure generation (SEC_GEN) based on an index conversion function that takes as its input parameter an index (i,j) of a virtual element of the second state array (MAT2) and outputs the index (ic,jc) of the corresponding element in the current state array (MAT1).

10. The electronic device (SCARD) according to claim 8, wherein the shift applied to a row during generation (SHFT_R) of the second state array (MAT2) is a shift of n elements, n denoting the row number, the first row being numbered n=0.

11. The electronic device (SCARD) according to claim 8, wherein the mixing of elements of a column of the second state array (MAT2) in order to obtain an element of the third state array (MAT3) during its generation (MIX_C) is a linear combination of these elements.

12. The electronic device (SCARD) according to claim 11, wherein the scalars used for the linear combination are dependent on the row where the element of the third state array is located.

* * * * *